No. 886,318. PATENTED APR. 28, 1908.
A. L. EICHER.
PROCESS OF MAKING LOCK NUTS.
APPLICATION FILED MAY 31, 1905.

WITNESSES
Jos J Hosler
Minnie F. Anthony

INVENTOR
Albert L. Eicher
BY
Harry Frease
ATTORNEY

UNITED STATES PATENT OFFICE.

ALBERT L. EICHER, OF ALLIANCE, OHIO.

PROCESS OF MAKING LOCK-NUTS.

No. 886,318.   Specification of Letters Patent.   Patented April 28, 1908.

Original application filed October 26, 1904, Serial No. 230,038. Divided and this application filed May 31, 1905.
Serial No. 263,074.

*To all whom it may concern:*

Be it known that I, ALBERT L. EICHER, a citizen of the United States, residing at Alliance, in the county of Stark and State of Ohio, have invented a new and useful Process of Making a Lock-Nut, of which the following is a specification.

The invention relates to a method of making a nut which will automatically lock or bind itself on the threaded shank of the bolt when applied thereon; and the object of the improvement is to make the nut complete within itself and so that it will operate without any collateral attachment or appliance, excepting only the ordinary wrench used to turn it on to the bolt shank. This object is attained by the method of making the nut, some of the features of which are illustrated in the accompanying drawing, in which—

Figure 1:
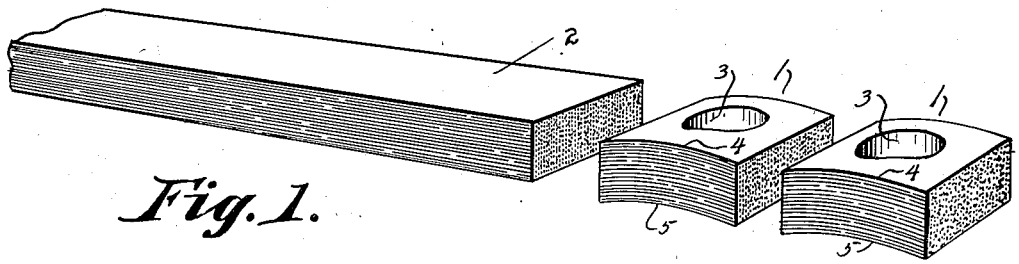
Figure 2:
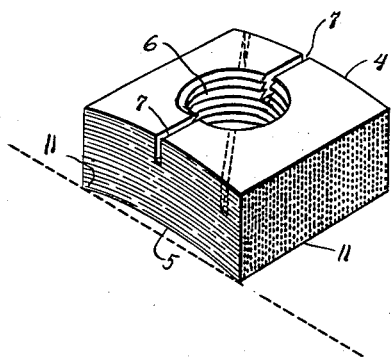
Figure 3:
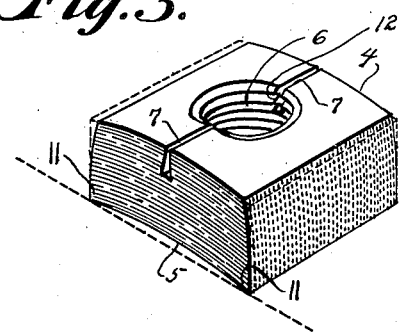
Figure 4:
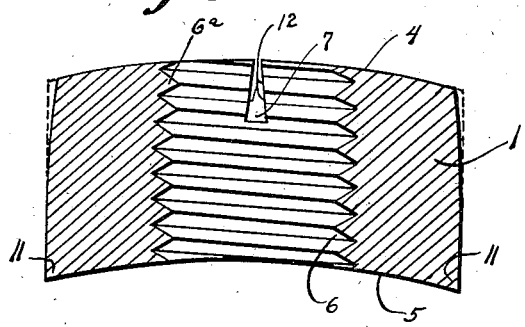
Figure 5:
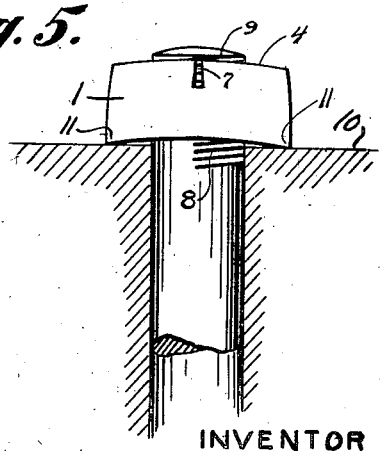

Figure 1 is a perspective view of a bar of metal showing two nut blanks cut off the end; Fig. 2, a perspective view of the nut with the thread cut therein and a kerf cut across the outer face; Fig. 3, a similar view showing the outer parts of the nut compressed to partly close the kerf; Fig. 4, an enlarged section of the finished nut showing the constricted aperture and deflected threads in the face side; and Fig. 5, a side elevation of the nut applied on the shank of a bolt.

Similar numerals refer to similar parts throughout the drawing.

The nuts are made out of the blanks 1, preferably cut from a bar 2 of suitable metal, and this bar is made, preferably by rolling, so that there is a grain in the metal running through the nut in one direction, and the transverse direction will be across the grain. Furthermore, the fibers or grain of a rolled bar are sometimes arranged somewhat in layers in one direction; and it is preferred to have these laminations perpendicular to the faces of the nut rather than parallel therewith, although this feature is not essential. The laminated structure of the bar metal may be caused by the manipulation of the same in the process of "puddling," or it may be caused by the effect of the rolls in reducing the bar from an ingot. When the blank is cut, and for facility in manufacture preferably by the same operation, the axial aperture 3 is punched in the blank and the same is bent or curved in the direction of its depth to be convex on its outer face 4 and concave on its inner face 5, the convexity and concavity being longitudinal with reference to the grain of the metal.

The usual thread 6 is then cut in the axial aperture, and the kerf 7 is cut in the outer face of the nut and preferably diametrically across the grain thereof. The kerf is shown as being cut squarely across the grain, which is generally the best location for it, but if desired it can be made somewhat diagonal, as indicated by broken lines in Fig. 2. After the kerf is cut the adjacent outer parts of the nut are compressed endwise, that is in the direction of the grain, so as to approximately close the kerf, as shown in Figs. 3 and 4. This compression inclines or curves the ends of the nut inward toward its outer face, and the closing of the kerf is accomplished principally by a longitudinal rearrangement of the molecules of the metal in the outer part of the nut, but there may also be a partial but preferably not an entire straightening of the curved blank. The bending inward of the outer part of the nut on each side of the kerf acts to deflect slightly downward the threads $6^a$ in the outer part of the aperture, as shown in Fig. 4.

The purpose of making the nut with the laminations of the grain substantially perpendicular to rather than parallel with the faces is to prevent a sliding of one lamination on another which might occur if the layers are distinctly marked and might rupture the fibers rather than bend or rearrange the molecules.

When the nut is turned onto the threaded shank 8 of a bolt the operation is ordinary until the outer constricted part of the axial aperture reaches the end 9 of the shank, whereupon the shank is gripped by the bent in part of the nut on each side of the kerf. As the nut is turned against the object 10 the inner end-edges 11 first come in contact, and the further turning tends to straighten the remaining endwise curvature of the nut with the effect that the bolt-shank is more tightly gripped by the parts of the nut on each side of the kerf. The inward deflection of the outer parts of the threads of the nut acts to further bind the same against the threads of the bolt-shank; and the sharp edges 12 of the nut threads, where the same are cut by the kerf, tend to gouge or bite into the threads of the bolt-shank, which further binds the nut on the shank. By the coöperation of these several features of construction, which all tend to tighten and grip the nut on the shank with a power increasing in intensity as the nut is turned against the object, the nut is securely locked on the bolt-shank, from which it can only be removed by the use of a power considerably greater than that by which it is applied. And it is found empirically that when the nut is applied to the shank, and the binding parts have set in their locking relation, the power required to remove the nut is much greater than when the nut is first applied. It is evident that the endwise curvature of the nut is not essential to the binding effect of the bent in parts on each sides of the kerf, but this curvature is desirable because it assists and augments the locking action of the nut. The lock-nut produced by the process illustrated and described but not claimed herein, is made the subject of another application for Letters Patent filed October 26, 1904, Serial Number 230,038, of which this application is a divisional part; excepting with reference to a nut with the laminations of the grain perpendicular to the faces, concerning which another application for Letters Patent will be filed.

What I claim as my invention, and desire to secure by Letters Patent, is—

1. The process of making a lock-nut out of a nut having a through grain and a threaded axial aperture therein, consisting in cutting a kerf in the outer face across the grain and the end of the aperture and then compressing the adjacent outer parts of the nut endwise along the grain to approximately close the kerf.

2. The process of making a lock-nut out of a nut having a through grain with laminations substantially perpendicular to it faces, and having a threaded axial aperture in the plane of the laminations, consisting in cutting a kerf in the outer face across the grain and the end of the aperture, and compressing the adjacent outer parts of the nut endwise to approximately close the kerf.

In testimony whereof I have signed my name to this specification in the presence of two subscribing witnesses.

ALBERT L. EICHER.

Witnesses:
HARRY FREASE,
MINNIE F. ANTHONY.